(12) United States Patent
Liu et al.

(10) Patent No.: US 11,522,594 B2
(45) Date of Patent: Dec. 6, 2022

(54) METHOD AND APPARATUS FOR MULTIPLE PANEL AND/OR MULTIPLE BEAM CODEBOOK BASED PUSCH TRANSMISSIONS

(71) Applicant: LENOVO (BEIJING) LIMITED, Beijing (CN)

(72) Inventors: Bingchao Liu, Beijing (CN); Chenxi Zhu, Beijing (CN); Lingling Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/276,441

(22) PCT Filed: Oct. 11, 2018

(86) PCT No.: PCT/CN2018/109897
§ 371 (c)(1),
(2) Date: Mar. 15, 2021

(87) PCT Pub. No.: WO2020/073289
PCT Pub. Date: Apr. 16, 2020

(65) Prior Publication Data
US 2022/0038158 A1    Feb. 3, 2022

(51) Int. Cl.
*H04L 5/12*      (2006.01)
*H04B 7/06*      (2006.01)
(Continued)

(52) U.S. Cl.
CPC ......... *H04B 7/0639* (2013.01); *H04B 7/0404* (2013.01); *H04B 7/0456* (2013.01);
(Continued)

(58) Field of Classification Search
CPC .. H04B 7/0639; H04B 7/0404; H04B 7/0456; H04L 5/0094; H04L 25/03898; H04W 72/042
(Continued)

(56) References Cited

U.S. PATENT DOCUMENTS 8,634,779 B2 *  1/2014  Moulsley .......... H04L 25/03891
                                               455/67.11
10,863,494 B2 * 12/2020  Zhang ................ H04L 5/0057
(Continued)

FOREIGN PATENT DOCUMENTS

CN      108112075 A    6/2018
EP        3160210 A1   4/2017
(Continued)

OTHER PUBLICATIONS

GPP, 3rd Generation Partnership Project; Technical Specification Group Radio Access Network; Remaining issues in codebook based URL transmission, 3GPP R2-1802095 Feb. 2018, pp. 1-4.*
(Continued)

*Primary Examiner* — Helene E Tayong
(74) *Attorney, Agent, or Firm* — Kunzler Bean & Adamson

(57) ABSTRACT

The present disclosure relates to method and apparatus for multiple panel and/or multiple beam codebook based PUSCH transmissions. The method includes receiving, at a User Equipment (UE), Downlink Control Information (DCI) including two or more sets of parameters; and performing codebook based Physical Uplink Shared Channel (PUSCH) transmission for transmitting the two or more codewords according to the two or more sets of parameters, respectively; wherein each of the two or more sets of parameters includes at least one of a Sounding Reference Signal Resource Indicator (SRI), a Transmitted Precoding Matrix
(Continued)

Indicator (TPMI), a Modulation Coding Scheme (MCS), a New Data Indicator (NDI) and a Redundancy Version (RV).

16 Claims, 3 Drawing Sheets

(51) Int. Cl.
  *H04B 7/0404* (2017.01)
  *H04B 7/0456* (2017.01)
  *H04L 5/00* (2006.01)
  *H04L 25/03* (2006.01)
  *H04W 72/04* (2009.01)

(52) U.S. Cl.
  CPC ...... *H04L 5/0094* (2013.01); *H04L 25/03898* (2013.01); *H04W 72/042* (2013.01)

(58) Field of Classification Search
  USPC .......................................................... 375/262
  See application file for complete search history.

(56) References Cited

U.S. PATENT DOCUMENTS

| | | | | |
|---|---|---|---|---|
| 2012/0082102 A1* | 4/2012 | Kang | ................... | H04B 7/0639 370/329 |
| 2012/0201212 A1* | 8/2012 | Xia | ...................... | H04L 1/0028 370/329 |
| 2013/0155977 A1* | 6/2013 | Seo | ...................... | H04L 5/0053 370/329 |
| 2016/0043789 A1* | 2/2016 | Wang | ................... | H04B 7/0617 370/329 |
| 2018/0026744 A1* | 1/2018 | Lyu | ...................... | H04L 1/0073 370/335 |
| 2019/0181921 A1* | 6/2019 | Lee | ...................... | H04B 7/0689 |

FOREIGN PATENT DOCUMENTS

| | | |
|---|---|---|
| EP | 3562052 A1 | 10/2019 |
| WO | 2018182381 A1 | 10/2018 |

OTHER PUBLICATIONS

International Searching Authority, "Notification of Transmittal of the International Search Report and the Written Opinion of the International Searching Authority, or the Declaration", PCT/CN2018/109897, Oct. 11, 2018, pp. 1-7.

3GPP, 3rd Generation Partnership Project; Technical Specification Group Radio Access Network; Considerations on UL beam management, 3GPP R1-1710057, Jun. 2017, pp. 1-4.

3GPP, 3rd Generation Partnership Project; Technical Specification Group Radio Access Network; On the number of codewords in NR, 3GPP R1-1705952, Apr. 2017, pp. 1-7.

3GPP, 3rd Generation Partnership Project; Technical Specification Group Radio Access Network; On Power Control Processes for Multi Beam Transmission in NR, 3GPP R1-1705515, Apr. 2017, pp. 1-4.

* cited by examiner

METHOD AND APPARATUS FOR MULTIPLE PANEL AND/OR MULTIPLE BEAM CODEBOOK BASED PUSCH TRANSMISSIONS

TECHNICAL FIELD

The present disclosure generally relates to a method and apparatus for communication, and more specifically, to a method and apparatus for codebook based PUSCH transmissions.

BACKGROUND OF THE INVENTION

Codebook based Uplink (UL) transmission is supported in New Radio (NR) Release 15, where only transmission from a single panel using a single beam is supported. Single panel based codebook transmission on Physical Uplink Shared Channel (PUSCH) can be supported in Release 15 by using only one Sounding Reference Signal Resource Indicator (SRI) and one Transmitted Precoding Matrix Indicator (TPMI) indicated by the Downlink Control Information (DCI). Protocol of multiple panel and/or multiple beam UL Multi-input Multi-output (MIMO) transmission will be introduced in NR Release 16.

In Long-Term Evolution (LTE) radio access network, multiple Tx/Rx Point (TRP) UL transmission is provided as UL Coordinated Multi-Point (CoMP) transmission. However, LTE radio access network only uses low frequency band, and performs PUSCH transmission to all CoMP Node with omni-directional beams. NR radio access network may use directional UL beams to perform transmission over Frequency Range 2 (FR2), which ranges from 6 GHz to 52.6 GHz. Thus, a new mechanism is required to implement UL multiple panel and multiple beam transmission in FR2.

BRIEF SUMMARY OF THE INVENTION

One embodiment of the present disclosure provides a method of transmitting two or more codewords in one Physical Uplink Shared Channel (PUSCH) transmission, the method includes: receiving, at a User Equipment (UE), Downlink Control Information (DCI) having two or more sets of parameters; and performing codebook based PUSCH transmission for transmitting the two or more codewords according to the two or more sets of parameters, respectively; wherein each of the two or more sets of parameters includes at least one of a Sounding Reference Signal Resource Indicator (SRI), a Transmitted Precoding Matrix Indicator (TPMI), a Modulation Coding Scheme (MC S), a New Data Indicator (NDI) and a Redundancy Version (RV).

Another embodiment of the present disclosure provides a method of scheduling a codebook based PUSCH transmission with two or more codewords, the method includes: transmitting a DCI including two or more sets of parameters for the codebook based PUSCH transmission with the two or more codewords, respectively; wherein each of the two or more sets of parameters includes at least one of a Sounding Reference Signal Resource Indicator (SRI), a Transmitted Precoding Matrix Indicator (TPMI), a Modulation Coding Scheme (MCS), a New Data Indicator (NDI) and a Redundancy Version (RV).

Yet another embodiment of the present disclosure provides an apparatus capable of transmitting a PUSCH with two or more codewords, the apparatus includes: a receiver, a processor and a transmitter. The receiver receives DCI having two or more sets of parameters. The processor performs codebook based PUSCH transmission for transmitting the two or more codewords according to the two or more sets of parameters, respectively. The transmitter transmits the codebook based PUSCH transmission. Each of the two or more sets of parameters includes at least one of an SRI, a TPMI, an MCS, an NDI and an RV.

Yet another embodiment of the present disclosure provides an apparatus capable of configuring a PUSCH transmission with two or more codewords, the apparatus includes: a receiver, a processor and a transmitter. The transmitter transmits DCI including two or more sets of parameters for codebook based PUSCH transmission with the two or more codewords, respectively. Each of the two or more sets of parameters includes at least one of an SRI, a TPMI, an MCS, an NDI and an RV.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for multiple panel and multiple beam codebook based PUSCH transmission. To facilitate understanding, embodiments are provided under specific network architecture and new service scenarios, such as 3GPP NR, 3GPP Long Term Evolution (LTE) Release 8 and so on. It is contemplated that, with the development of network architecture and new service scenarios, the embodiments in the present disclosure are also applicable to similar technical problems.

Figure 1:
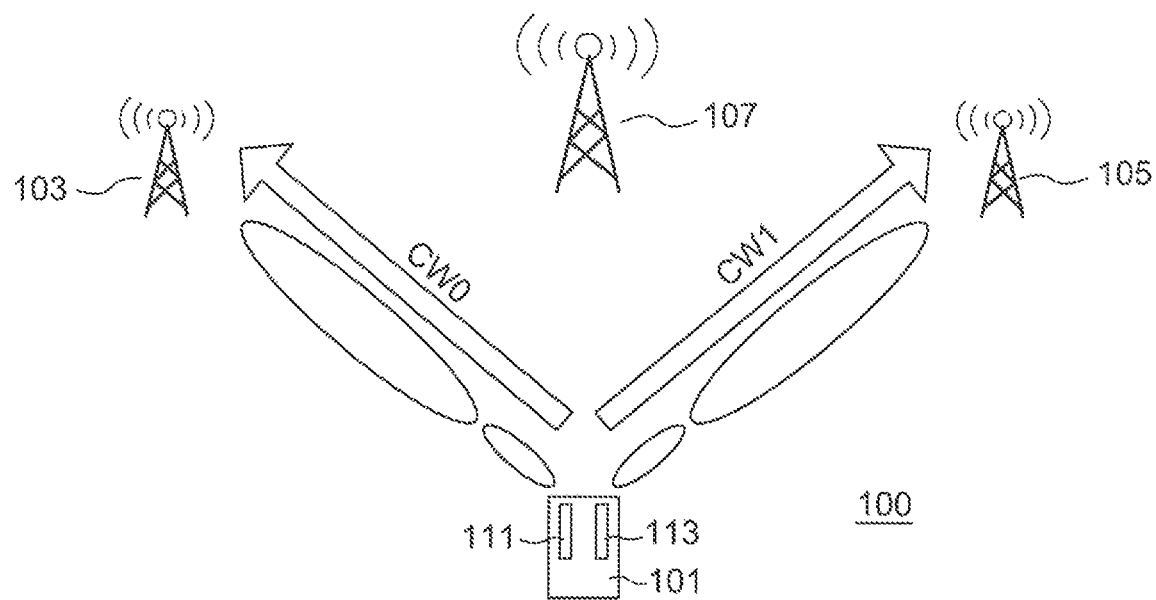
FIG. 1 illustrates an example block diagram of a wireless communication network according to an embodiment of the present disclosure.

FIG. 1 illustrates a wireless communication network 100 according to an embodiment of the present disclosure.

As shown in FIG. 1, the wireless communication network 100 includes a UE 101 and base stations 103, 105 and 107. It is contemplated that the wireless communication network 100 may include more UE(s) in some other embodiments of the subject application. Similarly, it is also contemplated that the wireless communication network 100 may include more or less base station(s) in some other embodiments of the subject application.

The UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), device(s) that constitutes internet of things (IoT), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101 includes wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with a base station 102 via UL communication signals.

The base stations 103, 105 and 107 may be distributed over a geographic region. In certain embodiments, each base station 103, 105 or 107 may also be referred to as an access point, an access terminal, a base, a base unit, a macro cell, a Node-B, an enhanced Node B (eNB), gNB, a Home Node-B, a relay node, or a device, or described using other terminology used in the art. Base station s103, 105 or 107 are generally part of a radio access network that may include one or more controllers communicably coupled to one or more corresponding base stations.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the base station 103, 105 or 107 transmits data using an orthogonal frequency division multiplexing (OFDM) modulation scheme on the DL and the UE 101 transmits data on the UL using a single-carrier frequency division multiple access (SC-FDMA) or OFDM scheme. More generally, however, the wireless communication system 100 may implement some other open or proprietary communication protocols, for example, WiMAX, among other protocols.

In other embodiments, base stations 103, 105 or 107 may communicate using other communication protocols, such as the IEEE 802.11 family of wireless communication protocols. Further, in some embodiments, base stations 103, 105 or 107 may communicate over licensed spectrum, whereas in other embodiments the base stations 103, 105 or 107 may communicate over unlicensed spectrum. The present disclosure is not intended to be limited to the implementation of any particular wireless communication system architecture or protocol. In another embodiment, base stations 103, 105 or 107 may communicate with the UE 101 using the 3GPP 5G protocols.

According to the present disclosure, a UE is equipped with two or more panels, and each panel communicates with a base unit in the wireless communication system.

Referring to FIG. 1, UE 101 is equipped with two panels 111 and 113, where panels 111 and 113 simultaneously communicate with base units 103 and 105, respectively. Two codewords (e.g. CW0 and CW1) may be transmitted substantially simultaneously from the two panels 111 and 113 via one PUSCH.

The present disclosure also provides a method performed by the UE for multiple panel and/or multiple beam codebook based PUSCH transmissions. The method includes receiving DCI having two or more sets of panel-specific parameters; and performing a codebook based PUSCH transmission for transmitting two or more codewords according to the two or more sets of panel-specific parameters, respectively; wherein each of the two or more sets of panel-specific parameters includes at least one of a Sounding Reference Signal Resource Indicator (SRI), a Transmitted Precoding Matrix Indicator (TPMI), a Modulation Coding Scheme (MCS), a New Data Indicator (NDI) and a Redundancy Version (RV).

According to some embodiments of the present disclosure, the method further includes substantially simultaneously transmitting two or more Sounding Reference Signal (SRS) resources configured in two or more SRS resource sets, respectively, wherein the two or more SRS resources are used for one codebook based PUSCH transmission.

Still referring to FIG. 1, two distinct or different SRS resource sets are configured for panels 111 and 113 of UE 101, respectively. In other words, an SRS set is configured for the panel 111 of UE 101, and another SRS set is configured for the panel 113 of UE 101.

After receiving the SRS resources, the SRS resources are substantially simultaneously transmitted to base units 103 and 105 by panels 111 and 113 respectively. A dedicated SRI is designated for each panel to indicate a spatial relation for PUSCH transmissions by such panel. Additionally, panel-specific MIMO parameters, such as a TPMI, an MCS, an NDI or an RV or a combination of at least two of the above parameters, should be indicated by the uplink grant along with the SRI.

A single beam transmission between one single panel and one single base unit may be supported. However, multiple beam transmissions in a wireless communication network 100 may have different characteristics. For example, transmission characteristic on a radio link (between panel 111 and base unit 103) may be quite different from transmission characteristics on a radio link (between panel 113 and base unit 105). Therefore, a single MCS and Transport Block Size (TBS) cannot support channels of both links (as mentioned above) at the same time.

In order to perform multiple beam transmissions in the wireless communication network 100, the subject application provides a method of codeword-to-layer mapping. The UE 101, which has two panels 111 and 113 for transmitting two codewords in parallel, may use a codeword-to-layer mapping scheme as provided in the following Table 1:

TABLE 1

| Number of layers | Number of codewords | Codeword-to-layer mapping $i = 0, 1, \ldots, M_{symb}^{layer} - 1$ | |
|---|---|---|---|
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
|  |  | $x^{(0)}(i) = d^{(0)}(2i)$ $x^{(1)}(i) = d^{(0)}(2i+1)$ $x^{(2)}(i) = d^{(1)}(i)$ | $M_{symb}^{layer} = M_{symb}^{(0)}/2 = M_{symb}^{(1)}$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |
|  |  | $x^{(0)}(i) = d^{(0)}(i)$ $x^{(1)}(i) = d^{(1)}(3i)$ $x^{(2)}(i) = d^{(1)}(3i+1)$ $x^{(3)}(i) = d^{(1)}(3i+2)$ | $M_{symb}^{layer} = M_{symb}^{(0)} = M_{symb}^{(1)}/3$ |
|  |  | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(i)$ | $M_{symb}^{layer} = M_{symb}^{(0)}/3 = M_{symb}^{(1)}$ |
| 5 | 2 | $x^{(0)}(i) = d^{(0)}(2i)$ $x^{(1)}(i) = d^{(0)}(2i+1)$ $x^{(2)}(i) = d^{(1)}(3i)$ $x^{(3)}(i) = d^{(1)}(3i+1)$ $x^{(4)}(i) = d^{(1)}(3i+2)$ | $M_{symb}^{layer} = M_{symb}^{(0)}/2 = M_{symb}^{(1)}/3$ |
|  |  | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(2i)$ $x^{(4)}(i) = d^{(1)}(2i+1)$ | $M_{symb}^{layer} = M_{symb}^{(0)}/3 = M_{symb}^{(1)}/2$ |
|  |  | $x^{(0)}(i) = d^{(0)}(i)$ $x^{(1)}(i) = d^{(1)}(4i)$ $x^{(2)}(i) = d^{(1)}(4i+1)$ $x^{(3)}(i) = d^{(1)}(4i+2)$ $x^{(4)}(i) = d^{(1)}(4i+3)$ | $M_{symb}^{layer} = M_{symb}^{(0)} = M_{symb}^{(1)}/4$ |
|  |  | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $x^{(4)}(i) = d^{(1)}(i)$ | $M_{symb}^{layer} = M_{symb}^{(0)}/4 = M_{symb}^{(1)}$ |
| 6 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(3i)$ $x^{(4)}(i) = d^{(1)}(3i+1)$ $x^{(5)}(i) = d^{(1)}(3i+2)$ | $M_{symb}^{layer} = M_{symb}^{(0)}/3 = M_{symb}^{(1)}/3$ |
|  |  | $x^{(0)}(i) = d^{(0)}(2i)$ $x^{(1)}(i) = d^{(0)}(2i+1)$ $x^{(2)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3)$ | $M_{symb}^{layer} = M_{symb}^{(0)}/2 = M_{symb}^{(1)}/4$ |
|  |  | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $x^{(4)}(i) = d^{(1)}(2i)$ $x^{(5)}(i) = d^{(1)}(2i+1)$ | $M_{symb}^{layer} = M_{symb}^{(0)}/4 = M_{symb}^{(1)}/2$ |
| 7 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3)$ | $M_{symb}^{layer} = M_{symb}^{(0)}/3 = M_{symb}^{(1)}/4$ |
|  |  | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $x^{(4)}(i) = d^{(1)}(3i)$ $x^{(5)}(i) = d^{(1)}(3i+1)$ $x^{(6)}(i) = d^{(1)}(3i+2)$ | $M_{symb}^{layer} = M_{symb}^{(0)}/4 = M_{symb}^{(1)}/3$ |
| 8 | 2 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $x^{(4)}(i) = d^{(1)}(4i)$ $x^{(5)}(i) = d^{(1)}(4i+1)$ $x^{(6)}(i) = d^{(1)}(4i+2)$ $x^{(7)}(i) = d^{(1)}(4i+3)$ | $M_{symb}^{layer} = M_{symb}^{(0)}/4 = M_{symb}^{(1)}/4$ |

Table 1 is developed based on LTE Downlink (DL) codeword-to-layer mapping scheme. In Table 1, "$d^{(n)}$" denotes symbols in codeword n, where n is 0 or 1; "$x^{(m)}$" denotes symbols in layer m, where m is 0, 1, 2, 3, ... $M^{(layer)}-1$; $M^{(layer)}$ denotes the number of symbols of a layer; and "$M^{(n)}$" denotes the number of symbols of codeword n. Although Table 1 only lists scenarios for transmitting two codewords in parallel for simplicity (e.g. n is 0 or 1), nevertheless, it is contemplated that other scenarios for transmitting more than two codewords in parallel may be developed in accordance with example of Table 1. In other words, n may not be limited to 0 or 1. The codeword-to-layer mapping scheme as shown in the above Table 1 may also be detailed below.

Figure 2:
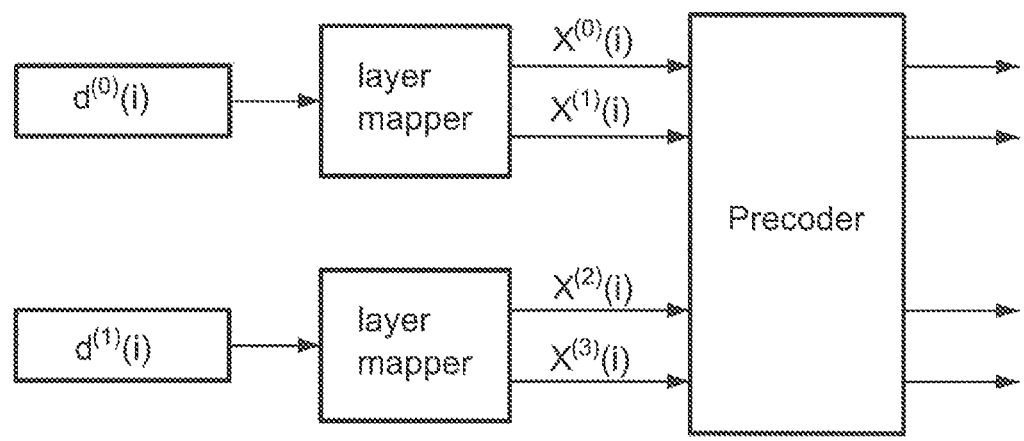
FIG. 2 illustrates a partial functional block diagram of a UE for mapping two codewords to four layers according to an embodiment of the present disclosure.

FIG. 2 is a partial functional block diagram of a UE for mapping two codewords (e.g. CW0 and CW1 as shown in FIG. 1) to four layers according to an embodiment of the present disclosure.

Referring to FIG. 2, $d^{(0)}$ (e.g. CW0 as shown in FIG. 1), which includes symbols $d^{(0)}(i)$, is mapped to two layers $x^{(0)}(i)$ and $x^{(1)}(i)$. Referring to Table 1, $x^{(0)}(i)=d^{(0)}(2i)$ and $x^{(1)}(i)=d^{(0)}(2i+1)$, which means that the symbols in CW0 are allocated to layer 0 and layer 1 in turns.

Referring back to FIG. 2, $d^{(1)}$ (e.g. CW1 as shown in FIG. 1), which includes symbols $d^{(1)}(i)$, is mapped to two layers $x^{(2)}(i)$ and $x^{(3)}(i)$. Referring to Table 1, $x^{(2)}(i)=d^{(1)}(2i)$ and $x^{(3)}(i)=d^{(1)}(2i+1)$, which means that the symbols in CW1 are allocated to layer 2 and layer 3 in turns. In such case, the number of symbols transmitted in a layer (e.g., $M_{symbol}^{(layer)}$) is equal to that of CW0 (e.g., $M_{symbol}^{(0)}$), and is equal to that of CW1 (e.g., $M_{symbol}^{(1)}$).

Figure 3:
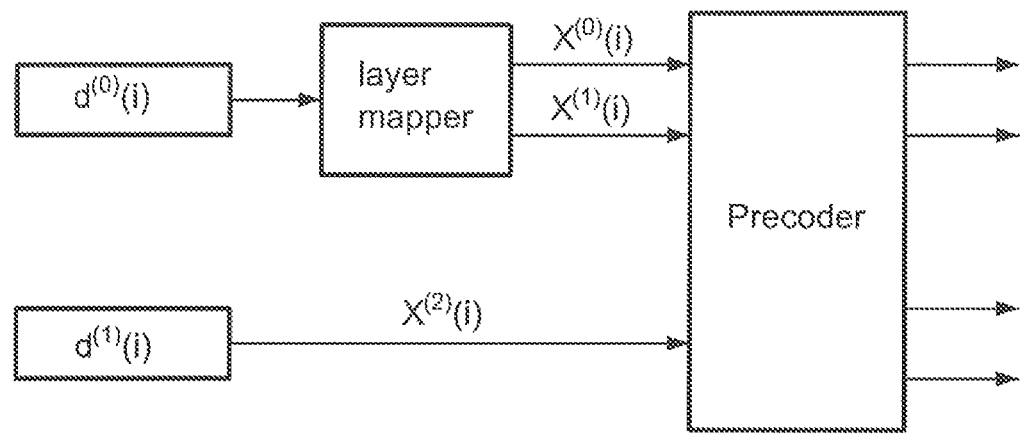
FIG. 3 illustrates a partial functional block diagram of a UE for mapping two codewords to three layers according to an embodiment of the present disclosure.

FIG. 3 is a partial functional block diagram of a UE for mapping two codewords (e.g. CW0 and CW1 as shown in FIG. 1) to three layers according to an embodiment of the present disclosure.

Referring to FIG. 3, $d^{(0)}$ (e.g. CW0 as shown in FIG. 1), which includes symbols $d^{(0)}(i)$, is mapped to two layers $x^{(0)}(i)$ and $x^{(1)}(i)$. Referring to Table 1, $x^{(0)}(i)=d^{(0)}(2i)$ and $x^{(1)}(i)=d^{(0)}(2i+1)$, which means that the symbols in CW0 are allocated to layer 0 and layer 1 in turns.

Referring back to FIG. 3, $d^{(1)}$ (e.g. CW1 as shown in FIG. 1), which includes symbols $d^{(1)}(i)$, is mapped to only one layer $x^{(2)}(i)$. Referring to Table 1, $x^{(2)}(i)=d^{(1)}(i)$, which means that all symbols in CW1 are allocated to layer 2. In such case, the number of symbols transmitted in a layer (e.g., $M_{symbol}^{(layer)}$) is equal to half the number of symbols transmitted in CW0 (e.g., $M_{symbol}^{(0)}/2$), and is equal to the number of symbols transmitted in CW1 (e.g., $M_{symbol}^{(1)}$).

Figure 4:
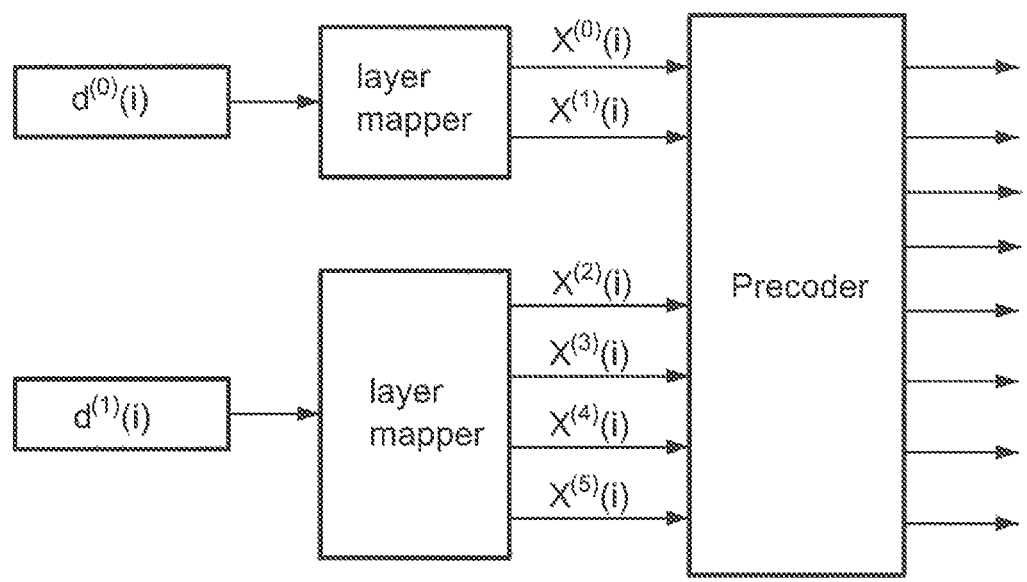
FIG. 4 illustrates a partial functional block diagram of a UE for mapping two codewords to six layers according to an embodiment of the present disclosure.

FIG. 4 is a partial functional block diagram of a UE for mapping two codewords (e.g. CW0 and CW1 as shown in FIG. 1) to six layers according to an embodiment of the present disclosure.

As shown in FIG. 4, $d^{(0)}$ (e.g. CW0 as shown in FIG. 1), which includes symbols $d^{(0)}(i)$, is mapped to two layers $x^{(0)}(i)$ and $x^{(1)}(i)$. Referring to Table 1, $x^{(0)}(i)=d^{(0)}(2i)$ and $x^{(1)}(i)=d^{(0)}(2i+1)$, which means that the symbols in CW0 are allocated to layer 0 and layer 1 in turns.

Referring back to FIG. 4, $d^{(1)}$ (e.g. CW1 as shown in FIG. 1), which includes symbols $d^{(1)}(i)$, is mapped to four layers $x^{(2)}(i)$, $x^{(3)}(i)$, $x^{(4)}(i)$, and $x^{(5)}(i)$. Referring to Table 1, $x^{(2)}(i)=d^{(1)}(4i)$, $x^{(3)}(i)=d^{(1)}(4i+1)$, $x^{(4)}(i)=d^{(1)}(4i+2)$, and $x^{(5)}(i)=d^{(1)}(4i+3)$, which means that the symbols in CW1 are allocated to layer 2, layer 3, layer 4 and layer 5 in turns. In such case, the number of symbols transmitted in a layer (e.g., $M_{symbol}^{(layer)}$) is equal to half the number of symbols transmitted in CW0 (e.g., $M_{symbol}^{(0)}/2$), and is equal to a quarter of the number of symbols transmitted in CW1 (e.g., $M_{symbol}^{(1)}/4$).

A rank indicator is used to indicate a number of layers that can be transmitted by each codeword. A rank number is a number of layers transmitted for each codeword. According to some embodiments of the present disclosure, a rank number for a codeword may be different from a rank number for another codeword. In LTE DL transmission, the layers are somewhat evenly arranged to each codeword. For example, if there are four layers for transmitting two codewords, each codeword is mapped to two layers; and if there are five layers, one codeword is mapped to two layers and the other codeword is mapped to three layers. According to some embodiments of the present disclosure, the layers may be unevenly arranged to each codeword. For example, if there are four layers, one codeword may be mapped to one layer and the other codeword may be mapped to three layers; and if there are five layers, one codeword may be mapped to one layer and the other codeword may be mapped to four layers. It is contemplated that, according to some other embodiments, the layers may also be evenly arranged to each codeword.

According to some embodiments of the present disclosure, the method performed by the UE for multiple panel and/or multiple beam codebook based PUSCH transmissions may include generating a precoding matrix according to two or more sub-matrices respectively indicated by the two or more TPMIs; and performing precoding in accordance with the precoding matrix.

In order to perform multiple panel and/or multiple beam codebook based PUSCH transmissions, a TPMI is required to indicate a precoding matrix for each panel.

Referring back to FIG. 1, two panels 111 and 113 are utilized for performing the PUSCH transmissions, two TPMIs for indicating precoding matrices are required. In a condition that each of the panels 111 and 113 has two antenna ports, the precoding matrix W for each panel can be selected from the Rel-15 NR UL codebook defined in Table 6.3.1.5-1 and Table 6.3.1.5-4 in TS38.211. In a condition that each of the panels has four antenna ports, the precoding matrix W for each panel can be selected from the Rel-15 NR UL codebook defined in Table 6.3.1.5-3, Table 6.3.1.5-5, Table 6.3.1.5.4-6 and Table 6.3.1.5-7 in TS38.211.

Assuming a TPMI indicates a precoding matrix $W_1$ for panel 111, and another TPMI indicates a precoding matrix $W_2$ for panel 113, a precoding matrix W for precoding data streams converted from two codewords (e.g. CW0 and CW1 as shown in FIG. 1) can be generated according to the precoding matrix $W_1$ and the precoding matrix $W_2$. According to some embodiments of the present disclosure, the precoding matrix W may be generated by arranging $W_1$ and $W_2$ on a diagonal of the precoding matrix W and the rest of the elements in the precoding matrix W may be set to zero. In other words, the precoding matrix W is generated according to two sub-matrices $W_1$ and $W_2$.

Referring back to FIG. 2, assuming each panel has two antenna ports, the precoder (or precoding matrix) for four antenna ports may be generated as follows:

$$W^{(4)} = \begin{bmatrix} W_1^{(2)} & 0_2 \\ 0_1 & W_2^{(2)} \end{bmatrix},$$

where $0_1$ is an all-zero matrix with the same dimension as $W_1^{(2)}$, and $0_2$ is an all-zero matrix with the same dimension as $W_2^{(2)}$.

The output of precoder is $$W^{(4)} \cdot \begin{bmatrix} x^{(0)} \\ \vdots \\ x^{(3)} \end{bmatrix},$$

which will be transmitted over four antenna ports.

Referring back to FIG. 4, assuming each panel has four antenna ports, the precoder (or precoding matrix) for eight antenna ports may be generated as follows:

$$W^{(8)} = \begin{bmatrix} w_1^{(4)} & 0_2 \\ 0_1 & w_2^{(4)} \end{bmatrix}$$

In some other embodiments of the present disclosure, a precoder (or precoding matrix) for two antenna ports may be expressed as follows.

$$W^{(2)} = \begin{bmatrix} 1 & 0 \\ 0 & 1 \end{bmatrix}$$

Therefore, no TPMI is needed in such a case. In other words, the TPMI may be ignorable or ignored.

According to some other embodiments of the present disclosure, if UE is equipped with more than two panels, a precoding matrix may be generated utilizing more than two sub-matrices, which are indicated by more than two TPMIs, respectively. It is contemplated that other equation(s) for generating precoding matrix W may be derived from the above-mentioned disclosure.

The present disclosure also provides a method performed by a base unit (e.g. one of base unit 103, 105 or 107 as shown in FIG. 1 or any base unit other than the base unit 103, 105 or 107 (not shown in FIG. 1)) for configuring a PUSCH transmission with two or more codewords. The method includes transmitting a DCI including two or more sets of parameters for codebook based PUSCH transmission with two or more codewords, respectively; wherein each of the two or more sets of parameters includes at least one of a Sounding Reference Signal Resource Indicator (SRI), a Transmitted Precoding Matrix Indicator (TPMI), a Modulation Coding Scheme (MCS), a New Data Indicator (NDI) and a Redundancy Version (RV). In some embodiments, the above method is for configuring multiple panel and/or multiple beam codebook based PUSCH transmissions by a UE.

The above method may be performed by a base unit (e.g. a base unit 103 as shown in FIG. 1) to which the UE performs PUSCH transmission or another base unit (e.g. a base unit 105 as shown in FIG. 1) other than the base unit (e.g. base unit 103 as shown in FIG. 1) to which the UE performs the PUSCH transmission.

According to some embodiments of the present disclosure, a method is provided. The method includes configuring two or more SRS resource sets used for codebook based PUSCH transmission. A base unit (e.g. a base unit 103, 105 or 107 as shown in FIG. 1), which may receive the PUSCH transmissions, may configure two or more SRS resource set used for codebook for the UE and determine an SRI based on the received SRS resources transmitted from the UE. The determined SRI may be forwarded to the UE directly or through another base unit (e.g. base unit 103, 105 or 107 as shown in FIG. 1).

Figure 5:
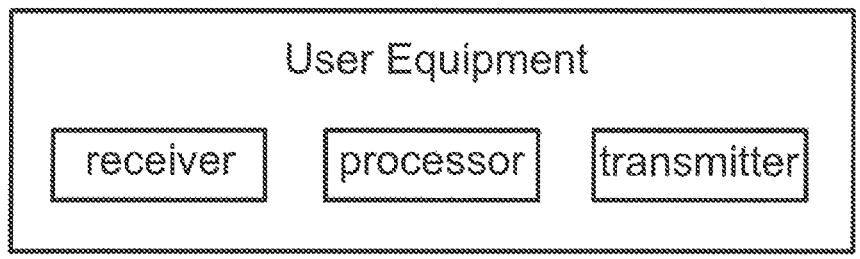
FIG. 5 illustrates an example block diagram of a User Equipment (UE) according to an embodiment of the present disclosure.

FIG. 5 illustrates a block diagram of a UE according to the embodiments of the present disclosure. The UE may include a receiver, a processor, and a transmitter. In certain embodiments, the UE may further include an input device, a display, a memory, and/or other elements. In one embodiment, the receiver receives DCI having two or more sets of parameters; the processor performs codebook based PUSCH transmission for transmitting two or more codewords according to the two or more sets of received parameters, respectively; and a transmitter that transmits the PUSCH transmission; wherein each of the two or more sets of parameters includes at least one of an SRI, a TPMI, an MCS, an NDI and an RV. The functions and implementations of all elements in the UE and the definitions of related technical terms are disclosed in the foregoing corresponding paragraphs in this specification.

Figure 6:
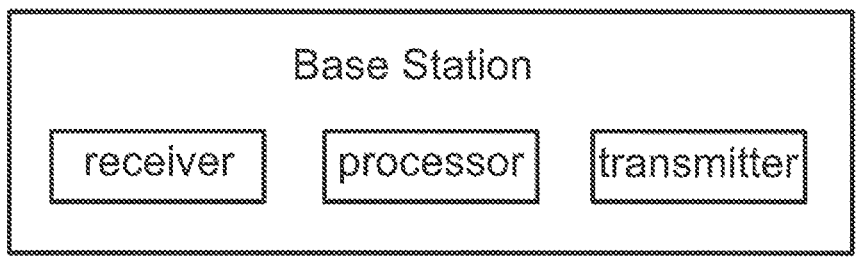
FIG. 6 illustrates an example block diagram of a base station according to an embodiment of the present disclosure.

FIG. 6 illustrates a block diagram of a base unit according to the embodiments of the present disclosure. The base station may include a receiver, a processor, and a transmitter. In certain embodiments, the base station may further include an input device, a display, a memory, and/or other elements. In one embodiment, the transmitter transmits DCI including two or more sets of parameters for codebook based PUSCH transmission with two or more codewords, respectively; wherein each of the two or more sets of parameters includes at least one of an SRI, a TPMI, an MCS, an NDI and an RV. The functions and implementations of all elements in the base unit and the definitions of related technical terms are disclosed in the foregoing corresponding paragraphs in this specification.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," "includes," "including," "has," "having," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method of a user equipment, the method comprising:
receiving, at the user equipment, downlink control information comprising two sounding reference signal resource indicators and two transmitted precoding matrix indicators;
performing codebook based physical uplink shared channel transmission according to the two sounding references signal resource indicators and the two transmitted precoding matrix indicators; and
transmitting two or more sounding reference signal resources configured in two or more sounding reference signal resource sets, respectively, wherein the two or more sounding reference signal resources are used for the codebook based physical uplink shared channel transmission.

2. The method of claim 1, further comprising performing codeword-to-layer mapping, wherein a rank number for a first codeword of two or more codewords is different from another rank number for a second codeword of the two or more codewords if two codewords are transmitted.

3. The method of claim 2, wherein the first codeword is mapped to two layers and the second codeword is mapped to one layer if the rank number of the first codeword is indicated as two, and the another rank number of the second codeword is indicated as one if two codewords are transmitted.

4. The method of claim 2, wherein the first codeword is mapped to three layers and the second codeword is mapped to one layer if the rank number of the first codeword is indicated as three, and the another rank number of the second codeword is indicated as one if two codewords are transmitted.

5. The method of claim 2, wherein the first codeword is mapped to three layers and the second codeword is mapped to two layers if the rank number of the first codeword is indicated as three, and the another rank number of the second codeword is indicated as two if two codewords are transmitted.

6. The method of claim 2, wherein the first codeword is mapped to one layer and the second codeword is mapped to four layers if the rank number of the first codeword is indicated as one, and the another rank number of the second codeword is indicated as four if two codewords are transmitted.

7. The method of claim 2, wherein the first codeword is mapped to two layers and the second codeword is mapped to four layers if the rank number of the first codeword is indicated as two, and the another rank number of the second codeword is indicated as four if two codewords are transmitted.

8. The method of claim 2, wherein the first codeword is mapped to four layers and the second codeword is mapped to three layers if the rank number of the first codeword is indicated as four, and the another rank number of the second codeword is indicated as three if two codewords are transmitted.

9. The method of claim 1, further comprising:
generating a precoding matrix according to two or more sub-matrices respectively indicated by the two or more transmitted precoding matrix indicators; and
performing precoding in accordance with the precoding matrix.

10. The method of claim 9, wherein a first sub-matrix of the two or more sub-matrices is arranged at a first position on a diagonal of the precoding matrix, wherein a second sub-matrix of the two or more sub-matrices is arranged at a second position on the diagonal of the precoding matrix, and wherein the first position is different from the second position.

11. The method of claim 1, wherein the transmitted precoding matrix indicator is ignorable if only two antennas are used for the codebook based physical uplink shared channel transmission.

12. An apparatus comprising a user equipment, the apparatus further comprising:
a receiver that receives downlink control information comprising two sounding reference signal resource indicators and two transmitted precoding matrix indicators;
a processor that performs codebook based physical uplink shared channel transmission according to the two sounding references signal resource indicators and the two transmitted precoding matrix indicators; and
a transmitter, wherein the transmitter transmits two or more sounding reference signal resources configured in two or more sounding reference signal resource sets, respectively, wherein the two or more sounding reference signal resources are used for the codebook based physical uplink shared channel transmission.

13. The apparatus of claim 12, wherein the processor performs codeword-to-layer mapping, wherein a rank number for a first codeword of two or more codewords is different from another rank number for a second codeword of the two or more codewords.

14. The apparatus of claim 13, wherein the first codeword is mapped to two layers and the second codeword is mapped to one layer if the rank number of the first codeword is indicated as two, and the another rank number of the second codeword is indicated as one.

15. The apparatus of claim 13, wherein the first codeword is mapped to three layers and the second codeword is mapped to one layer if the rank number of the first codeword is indicated as three, and the another rank number of the second codeword is indicated as one.

16. The apparatus of claim 13, wherein the first codeword is mapped to three layers and the second codeword is mapped to two layers if the rank number of the first codeword is indicated as three, and the another rank number of the second codeword is indicated as two.

* * * * *